W. L. BLISS.
ADAPTER FOR CAR LIGHTING GENERATORS.
APPLICATION FILED JAN. 9, 1912.

1,197,179.  Patented Sept. 5, 1916.

Witnesses:
Robert H. Weir
Geo. B. Jones.

Inventor
William L. Bliss:
By: Edwin B. Towers Jr.
Atty.

UNITED STATES PATENT OFFICE.

WILLIAM L. BLISS, OF NIAGARA FALLS, NEW YORK, ASSIGNOR, BY MESNE ASSIGNMENTS, TO U. S. LIGHT & HEAT CORPORATION, OF NIAGARA FALLS, NEW YORK, A CORPORATION OF NEW YORK.

ADAPTER FOR CAR-LIGHTING GENERATORS.

1,197,179.　　　　　Specification of Letters Patent.　　Patented Sept. 5, 1916.

Application filed January 9, 1912. Serial No. 670,279.

*To all whom it may concern:*

Be it known that I, WILLIAM L. BLISS, a citizen of the United States, residing at Niagara Falls, in the county of Niagara and State of New York, have invented new and useful Improvements in Adapters for Car-Lighting Generators, of which the following is a full, clear, concise, and exact description, reference being had to the accompanying drawing, forming a part of this specification.

My invention relates to adapters for car lighting generators.

In modern car lighting systems the car lighting generator is commonly carried by a generator suspension or frame mounted on one of the car trucks. One type of generator suspension comprises a pair of substantially parallel cross-bars on which the generator is removably mounted. The generator suspension of which these cross-bars form a part is designed so as to bring these cross-bars at a certain distance above the rails and roadbed, in order to fulfil certain requirements for clearance in this regard, and also so as to bring the generator armature shaft at a certain predetermined height with respect to the height of the driving axle, so that the generator armature may be conveniently driven by a belt connection with said axle. Where a generator suspension has been designed to accommodate a certain style or type of car lighting generator it is sometimes desirable or necessary to mount on the generator suspension a generator of a somewhat different construction or type from that for which the suspension was originally designed. In such cases it may happen that with the generator so mounted, the armature shaft may be lower than desirable for a proper arrangement of the belt drive.

The object of my invention is to provide an adapter which may be interposed between the generator and the supporting cross-bars in a case such as outlined above, whereby not only will the generator armature shaft be located at the proper height, but the various adjustments of the generator with respect to its supporting frame and with respect to the car truck as a whole will also be permitted.

In the accompanying drawings I have illustrated one form of adapter which has given satisfactory results in service. Other forms of adapters may also be devised to meet special requirements and which fall within the scope of the invention.

Figure 1:
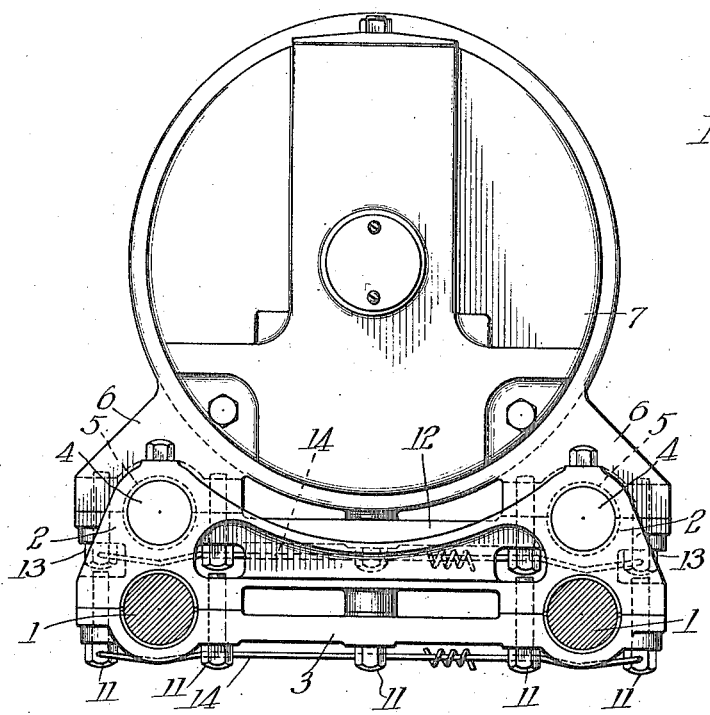
Figure 2:
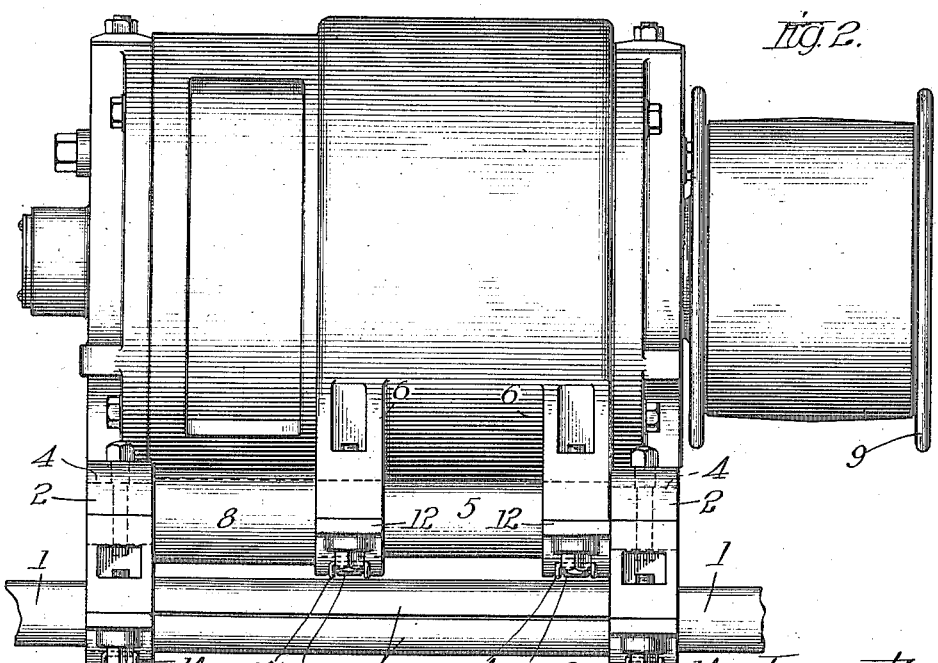

The views of the drawings are as follows:

Figure 1 is a side elevation of one form of adapter, showing its location with respect to the supporting cross-bars and with respect to the car lighting generator which it supports. Fig. 2 is an elevation shown at right angles to that seen in Fig. 1.

The generator suspension includes the substantially parallel supporting cross-bars 1. These bars support the adapter which comprises, in general, a pair of similar frames, each having a main body portion 2 and a removable lower portion or continuous foot cap 3. Each frame has two openings in the lower portion near opposite ends thereof through which the cross-bars 1 pass loosely. These openings are formed half in the main body portion of the frame and half in the removable foot cap, so that when the foot cap is bolted to the rest of the frame two circular openings are provided, as is shown clearly in Fig. 1. Each frame is provided also in its upper portion with a pair of oppositely disposed openings preferably somewhat smaller than the two lower openings. Each upper opening is located preferably in vertical alinement to the corresponding lower opening, and the upper openings are spaced apart exactly the same distance as the lower openings. The upper openings are adapted to receive the reduced ends 4 of short rods 5. These rods 5 are of the same diameter as the supporting cross-bars 1 and pass through openings in the lugs 6 on the field frame of the car lighting generator 7. The openings in the lugs 6 are of such a size that the generator may be mounted directly on the cross-bars 1 in the usual manner, with said cross-bars passing through the openings in said lugs. By the use of the adapter, however, the generator is raised an amount equal to the vertical distance between the center lines of the upper pair and lower pair of openings in the adapter frames. The collar or tube 8 is preferably slipped over each rod 5 in order to prevent the generator from sliding back and forth along said rods, thereby maintaining the pulley 9 in alinement with the driving pulley (not shown) after the generator adapter has been suitably adjusted back and forth along the cross-bars 1 and clamped in the proper position of adjustment. Split sections of tubing 10 preferably surround the cross-bars 1 and extend between the two frames of the adapter, as seen in Fig. 2. The ends of these tubes are received within the lower openings in said frames.

The foot caps 3 are secured to the main body portion 2 by a plurality of studs 11, and the generator foot caps 12 are also secured in a similar manner by studs 13. To prevent these studs from working loose and possible loss of the same, the various groups are preferably provided with a wire 14 threaded through the heads of the studs, whereby the various studs are prevented from turning, and thereby prevented from working loose and falling out.

It is apparent that various departures may be made from the structure disclosed without departing from the spirit of the invention.

What I claim as new and desire to secure by Letters Patent of the United States is:

1. An adapter for a car lighting generator comprising cross-bars spaced apart the same distance as the main supporting cross-bars of the generator suspension and arranged above said cross-bars in a suitable frame, whereby said cross-bars may support a car lighting generator in a position parallel to and at a certain distance above its position if supported directly on said main cross-bars.

2. An adapter for a car lighting generator comprising suitable frames spaced apart, cross-rods carried by said frames and supported above the suspension cross-bars which support said frame, whereby a car lighting generator may be supported on said cross-rods in the same manner as if supported on said suspension cross-bars but in an elevated position.

3. An adapter for a car lighting generator comprising two frames each having four openings therethrough, the lower openings of each frame being adapted to receive the main supporting elements of a generator suspension and the upper openings of each frame being adapted to receive cross-rods which space said frames apart and which are adapted to support a car lighting generator directly thereon.

4. In combination, a car lighting generator having oppositely extending supporting lugs thereon, a continuous foot cap secured to opposite lugs of a pair, cross-rods extending through openings formed in said lugs and foot cap, a pair of frames spaced apart by said rods and having openings to receive the reduced ends of said rods, each frame having a removable foot cap with openings formed by said frame and said foot cap, and suspension bars passing through said openings whereby the generator and parts associated therewith are supported thereby.

5. As a new article of manufacture, a generator adapter comprising a pair of frames each having a removable foot cap, a pair of cross-bars having reduced ends which are received by openings in said frames, whereby said frames are suitably spaced apart, said frames being adapted to support a car lighting generator, and a collar surrounding said cross-rods for a portion of their length for the purpose of suitably spacing said generator with respect to said cross-rods.

6. An adapter for mounting a car lighting generator on cross-bars, a frame mounted on and connecting said cross-bars together, means for securing said frame to said cross-bars, and means for securing a generator to said frame above said cross-bars.

In witness whereof, I have hereunto subscribed my name in the presence of two witnesses.

WILLIAM L. BLISS.

Witnesses:
 WM. A. TURBAYNE,
 F. J. CALLOHAN.